United States Patent [19]
Barry

[11] 4,096,647
[45] Jun. 27, 1978

[54] LEARN-TO-DRESS MANUAL

[76] Inventor: James Robert Barry, 160 Regent St., Lincoln, Ill. 62656

[21] Appl. No.: 795,752

[22] Filed: May 11, 1977

Related U.S. Application Data

[63] Continuation-in-part of Ser. No. 625,000, Oct. 22, 1975, abandoned.

[51] Int. Cl.² .......................................... G09B 19/00
[52] U.S. Cl. ..................................................... 35/56
[58] Field of Search ................. 35/8 R, 29 E, 53, 56, 35/DIG. 1

[56] References Cited
U.S. PATENT DOCUMENTS

| | | | |
|---|---|---|---|
| 2,155,924 | 4/1939 | Barrett | 35/53 |
| 2,501,902 | 3/1950 | Howell | 35/56 |
| 2,527,242 | 10/1950 | Clark | 35/56 |
| 2,828,554 | 4/1958 | Harris | 35/53 |
| 2,972,820 | 2/1961 | Cano | 35/56 |
| 3,546,789 | 12/1970 | Kushell | 35/8 R |
| 3,715,816 | 2/1973 | White | 35/8 R |

FOREIGN PATENT DOCUMENTS

| | | | |
|---|---|---|---|
| 1,355,200 | 2/1964 | France | 35/8 R |
| 909,152 | 10/1962 | United Kingdom | 35/8 R |

OTHER PUBLICATIONS

"Self-Help Cloth Books," Creative Playthings, 1969-1970, p. 14.
"Cloth Bricks" Crative Playthings Catalog Rec'd, Sep. 30, 1970, p. 17.
Dr. Montessori's Own handbook Copyright, Aug. 1914, pp. 20, 21, 22, 23, FIG. 3, FIG. 4.
Covers with "Scotchgard" Stain Repeller on Durable Fabric, p. 1566, Sears-Roebuck Fall-Winter 1963 Cat.

*Primary Examiner*—Harland S. Skogquist
*Attorney, Agent, or Firm*—Ralph F. Staubly

[57] ABSTRACT

The disclosure is a learn-to-dress manual having a synthetic hard-board base lamina and a plurality of superposed pairs of panels simulating garment members to be interconnected in dressing operations. The paired panels are preferably made of tear-resistant cloth or tough plastic having easily cleanable surfaces, and are fastened to the base lamina by rigidly fixed arched-portion rods passing through eyelets in the outer lateral margins of each panel portion. The faces of the panels of each pair are of the same bright color, which differs markedly from the color of adjacent superposed pairs. The under side of each panel is of a non-distracting coloration. The training exercises progress generally in difficulty into and out of the manual, starting with buckles on belts holding paired hard-board panels protectively over the underlying paired panels, and progressing through buttons, snaps, hook-and-eye fasteners, etc., to finally a lace-closed shoe top on the base lamina.

5 Claims, 13 Drawing Figures

U.S. Patent     June 27, 1978     4,096,647
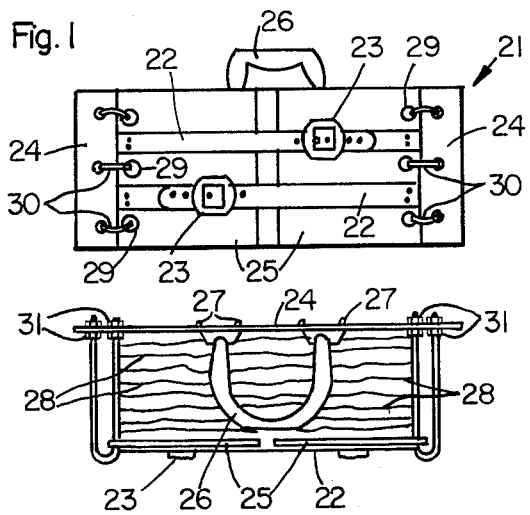
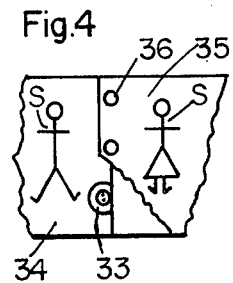
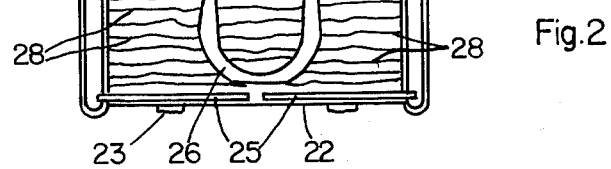
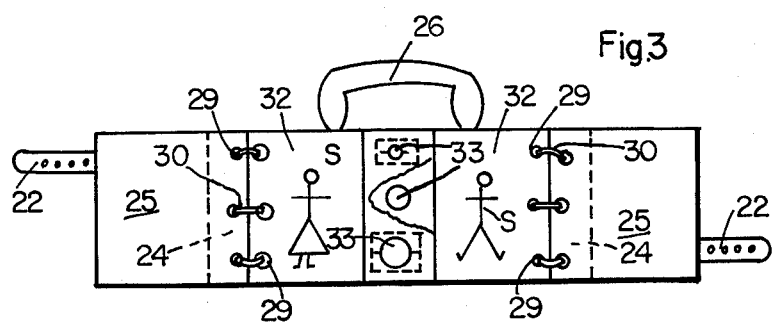
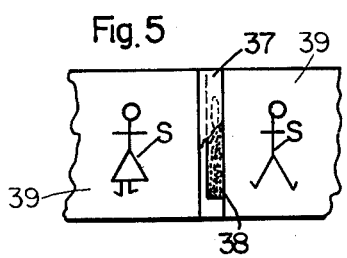
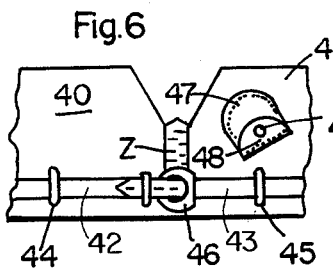
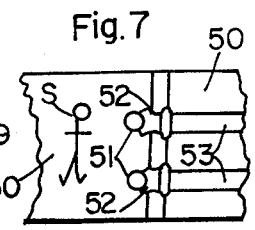
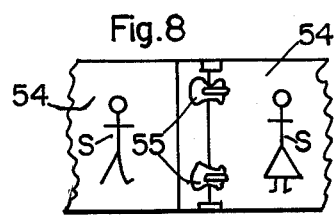
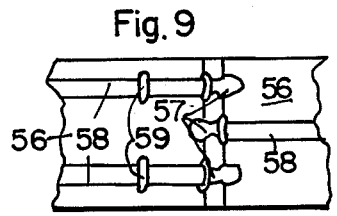
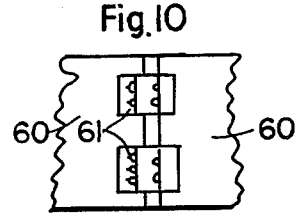
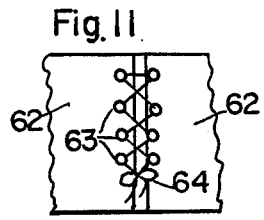
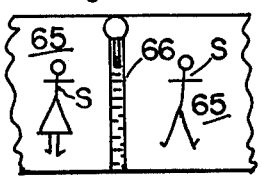
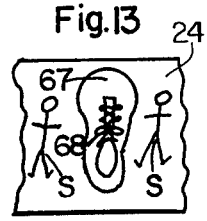

LEARN-TO-DRESS MANUAL

This application is a continuation-in-part of now abandoned application Ser. No. 625,000, filed Oct. 22, 1975 and identically entitled.

BACKGROUND AND OBJECTS OF THE INVENTION

Learn-to-dress kits are known (e.g. Cano, U.S. Pat. No. 2,972,820), but none is known to be in the form of a hard-covered book or manual. It is accordingly the principal object of this invention to provide a hard-covered manual having superposed lessons or exercises, each comprising a pair of panels simulating garment parts and having mating garment-fastening means, with the exercises generally progressing in difficulty, and including occasional or frequent reward devices, such as pockets for coins, etc. Other objects and advantages will appear as the following detailed description proceeds.

BRIEF DESCRIPTION OF THE DRAWINGS

FIG. 1 is an elevational view of the closed manual in transporting condition and position.

FIG. 2 is a plan view of the showing of FIG. 1.

FIG. 3 is a plan view of the opened manual exposing the buttoning exercise.

FIG. 4 is a partial (central) plan view of a snap-connector exercise.

FIG. 5 is a partial plan view of a "VELCRO" fastener exercise.

FIG. 6 is a partial plan view of a trousers and belt-buckle exercise having a "reward" pocket.

FIG. 7 is a partial plan view of an overall-fastener.

FIG. 8 is a partial plan view of a raincoat-type fastener exercise.

FIG. 9 is a partial plan view of a shortenable suspender-type fastener.

FIG. 10 is a partial plan view of a hook-and-eye fastener.

FIG. 11 is a partial plan view of a lacing exercise.

FIG. 12 is a partial plan view of a "zipper" exercise.

FIG. 13 is a partial plan view of a base-mounted shoe-lacing exercise.

DETAILED DESCRIPTION

FIGS. 1 and 2 show the manual 21 in its closed condition for transporting or storing. FIG. 3 shows the manual opened to expose the first inside lesson, the belts 22 and buckles 23 constituting the first exercise. The manual 21 comprises a base 24 of synthetic hard-board and a pair of hard-board cover panels 25. A carrying handle 26 is swingably attached to the base 24 by brackets 27.

The exercises comprise pairs of tear-resistant tough plastic or cloth panels 28, at least the upper surfaces of which are preferably treated to be stain-resistant and easily cleaned, and are of bright colors, differing markedly from the colors of the immediately preceding or following pairs. The under surfaces of the pairs are of a dull or non-distracting coloration. The lateral margins of the panels 28 are provided with eyelets 29 which loosely receive arched rods 30. The rods 30 permit easy lateral swinging of the panels to the sides of the manual to overlie the opened cover panels 25 (FIG. 3) and to expose the next exercise. The rods 30 are fixed to the base 24 by nuts 31. Conventional openable loose-leaf-binder rings (not shown) can be substituted for the arched rods and could pass loosely through apertures in the base 24.

FIG. 3 shows the first inside exercise, a pair of garment panels 32, and buttons 33 of graded sizes. The panels 32 may be provided with symbols S to indicate up-down orientation. The panels of some or all of the succeeding exercises may carry the same or functionally equivalent symbols or pictures.

FIG. 4 shows a pair of panels 34 and 35 carrying mating snap-fastener elements 33 and 36. FIG. 5 employs "VELCRO" fastener parts 37 and 38 for the panels 39.

FIG. 6 is a trousers-and -belt exercise. Trouser-simulating panels 40 and 41 are closed by a Zipper Z and by belt portions 42 and 43 passing through belt-receiving strips 44 and 45 and connected by a buckle 46. The right panel 41 carries a pocket 47 closed by a flap 48 having a snap fastener 49. The pocket 47 may hold a coin, candy or other learning-encouraging "reward." Similar "reward" devices can be employed with other of the exercises as desired.

FIG. 7 is an overall-type fastener exercise having panels 50, enlarged-head buttons 51, and heavy-wire necked-down loops 52 carried by adjustable-length straps 53. FIG. 8 has panels 54 joined by pairs of raincoat-type fasteners 55. FIG. 9 employs a pair of panels 56 interconnected by a plurality of suspender-type clasp fasteners 57 on straps 58 made length-adjustable by conventional elements 59. FIG. 10 has a pair of panels 60 interconnected by patch-like cloth pieces 61 having hooks-and-eye pairs sewn thereto.

FIG. 11 discloses panels 62 provided along their mating margins with eyelets 63 to receive a lacing cord 64. FIG. 12 employs panels 65 joined by a conventional "zipper" fastener generally designated 66. FIG. 13 is the last exercise and comprises a shoe top 67 fixed to the base lamina 24 and provided with a shoe lace 68.

The invention having thus been described, what is claimed as being new and patentable is:

1. A learn-to-dress manual comprising: a relatively rigid flat base lamina; a shoe top, including lacings, fixed to the upper surface of said base lamina; a plurality of superposed pairs of stain-and tear-resistant panels simulating garment members to be interconnected in dressing operations, each pair being centrally divided and each divided portion being swingable laterally away from the other portion thereof to expose the next pair therebeneath, each pair having co-operating conventional means for interconnecting said divided portions in dressing-simulating manner, the upper surfaces of said pairs of garment-simulating panels being of bright attractive colors differing markedly from the colors of the immediately preceding and following pairs, and the under surfaces of said panels being of non-distracting coloration; a plurality of arched-portion rods fixed to the lateral margins of said base lamina; eyelets in the lateral margins of said panels loosely embracing said rods; a pair of relatively stiff cover panels apertured to receive said arched-portion rods; and at least one pair of belt sections including a belt buckle, to fasten said cover panels protectively over said pairs of garment-simulating panels and to constitute an introductory exercise.

2. Structure according to claim 1, said manual comprising at least four garment-simulating pairs of panels.

3. Structure according to claim 1, at least the upper faces of said panels having easily cleanable surfaces.

4. Structure according to claim 1, at least one of said panels having at least one pocket adapted to hold a learning-encouraging reward item therein.

5. Structure according to claim 1, at least one of said panels having orientation symbols thereon.

* * * * *